United States Patent
Flint et al.

(10) Patent No.: US 9,638,438 B2
(45) Date of Patent: May 2, 2017

(54) CIRCULATION HEATER

(71) Applicant: Cast Aluminum Solutions, LLC, Batavia, IL (US)

(72) Inventors: Michael Flint, Midland, MI (US); Anthony Meadors, Elmhurst, IL (US); Jesse Mondigo, Aurora, IL (US); Andrew Lee, Wheeling, IL (US); Kenneth Carney, Schaumburg, IL (US); Eric Hostert, Yorkville, IL (US)

(73) Assignee: Cast Aluminum Solutions, LLC, Batavia, IL (US)

( * ) Notice: Subject to any disclaimer, the term of this patent is extended or adjusted under 35 U.S.C. 154(b) by 118 days.

(21) Appl. No.: 14/325,970

(22) Filed: Jul. 8, 2014

(65) Prior Publication Data
US 2015/0016811 A1    Jan. 15, 2015

Related U.S. Application Data

(60) Provisional application No. 61/843,989, filed on Jul. 9, 2013.

(51) Int. Cl.
 *H05B 3/42* (2006.01)
 *B23P 15/26* (2006.01)
 *F24H 1/16* (2006.01)

(52) U.S. Cl.
 CPC ............. *F24H 1/162* (2013.01); *B23P 15/26* (2013.01); *H05B 3/42* (2013.01); *H05B 2203/021* (2013.01); *Y10T 29/49387* (2015.01)

(58) Field of Classification Search
 None
 See application file for complete search history.

(56) References Cited

U.S. PATENT DOCUMENTS 3,389,538 A * 6/1968 Carel .................... G01N 30/12
                                                     392/397
4,605,059 A   8/1986 Page
             (Continued)

FOREIGN PATENT DOCUMENTS

DE      662 412       7/1938
DE    3606930 A1      9/1987
             (Continued)

OTHER PUBLICATIONS

EP0444011A1, "Heating device for infusion . . . " Biegler, Aug. 1991, partial translation.*
             (Continued)

*Primary Examiner* — Joseph M Pelham
(74) *Attorney, Agent, or Firm* — Miller Canfield Paddock and Stone; Mark L Maki

(57) ABSTRACT

A circulation heater is provided which uses a cast body, having resistance heating elements therein and also having spirally wound Teflon tubing wrapped about the heater body. The heater body is formed of cast aluminum or other suitable cast material and after casting is machined to form at least one spiral channel for receiving the heater tube therein. The heater tube is pressed into the tubing channel as the heater tube is progressively wound spirally about the heater body. The channel is formed with an undercut profile wherein the channel is undercut to form a narrower mouth which allows the heater tube to be compressed and then snapped into the channel. The profile of this channel insures direct contact between the tubing and the channel wall over greater than 180 degrees or more than one half of the tube circumference to increase the area of surface contact between the heater tube and channel surface.

18 Claims, 6 Drawing Sheets

(56) References Cited

U.S. PATENT DOCUMENTS

| | | | |
|---|---|---|---|
| 4,709,135 A | 11/1987 | Dietrich et al. | |
| 5,474,538 A | 12/1995 | Stihler et al. | |
| 6,804,965 B2 | 10/2004 | Abras | |
| 7,276,046 B1 | 10/2007 | Suzuki et al. | |
| 7,526,922 B2 | 5/2009 | Abras | |
| 2004/0175166 A1* | 9/2004 | Bartscher | A61M 5/44 392/481 |
| 2009/0310951 A1* | 12/2009 | Capraro | A47J 31/542 392/465 |
| 2013/0202279 A1* | 8/2013 | Reichl | F24H 1/142 392/480 |

FOREIGN PATENT DOCUMENTS

| | | |
|---|---|---|
| DE | 37 26 453 | 2/1989 |
| EP | 0 181 447 | 5/1986 |
| EP | 0 444 011 | 8/1991 |
| EP | 2 042 821 | 4/2009 |
| FR | 4 12 373 | 7/1910 |
| JP | 2011144976 A * | 7/2011 |

OTHER PUBLICATIONS

The International Search Report and Written Opinion of the International Searching Authority for PCT/US2014/045744, date completed Oct. 8, 2014, date mailed Oct. 20, 2014.

\* cited by examiner

CIRCULATION HEATER

CROSS REFERENCE TO RELATED APPLICATIONS

This application asserts priority from provisional application 61/843,989, filed on Jul. 9, 2013, which is incorporated herein by reference.

FIELD OF THE INVENTION

The invention relates to a circulation heater for heating circulating fluid or gas for various industrial processes.

BACKGROUND OF THE INVENTION

Circulation heaters are used in industrial processes to heat circulating fluid or gas with accurate temperature control for various processes such as heating fluids, gases and liquids, for solvent heating, analytical instrumentation, steam generation, paint heating, food and beverage heating and other industrial applications. In one known circulation heater, electric resistance heating elements are cast within an aluminum heater body wherein circulating heater tube is cast directly within this heater body. The aluminum casting transfers heat from the heating elements to the heater tube, as well as to the fluid circulating through such tubing. However, in certain sensitive applications, the metallic tubing particles can leach out of the metal tube which might cause process contamination and yield loss in the circulating fluid.

The invention relates to an improved circulation heater which avoids leaching and contamination of the process fluid being heated. More particularly, the invention relates to a circulation heater which uses a cast aluminum body, having resistance heating elements therein and also having spirally wound Teflon tubing wrapped about the heater body. The heater body is formed of cast aluminum or other suitable material and is machined to form at least one spiral channel for receiving the heater tube therein. The heater tube is preferably formed of Teflon, although other suitable non-metal, flexible tubing materials can be used. Such tubing is flexible and preferably is resiliently compressible to a certain degree and also is bendable so as to allow insertion of the tubing into the pre-cut heater channel. The tubing for the heater is pressed into the tubing channel as the heater tube is progressively wound spirally about the heater body.

The channel is formed with an undercut profile wherein the channel cross section is undercut at a narrower mouth of the channel which allows the heater tube to be compressed and then snapped into the channel. The profile of this channel insures direct contact between the tubing and the channel wall over greater than 180 degrees or more than one half of the tube circumference to increase the area of surface contact between the heater tube and channel surface. This encourages and improves heat transfer between the aluminum and the Teflon tubing since there is surface to surface contact over half of the tubing surface.

This improved circulation heater provides advantages over known circulation heaters having metal cast within the body of the heater.

Other objects and purposes of the invention, and variations thereof, will be apparent upon reading the following specification and inspecting the accompanying drawings.

Figure 1:
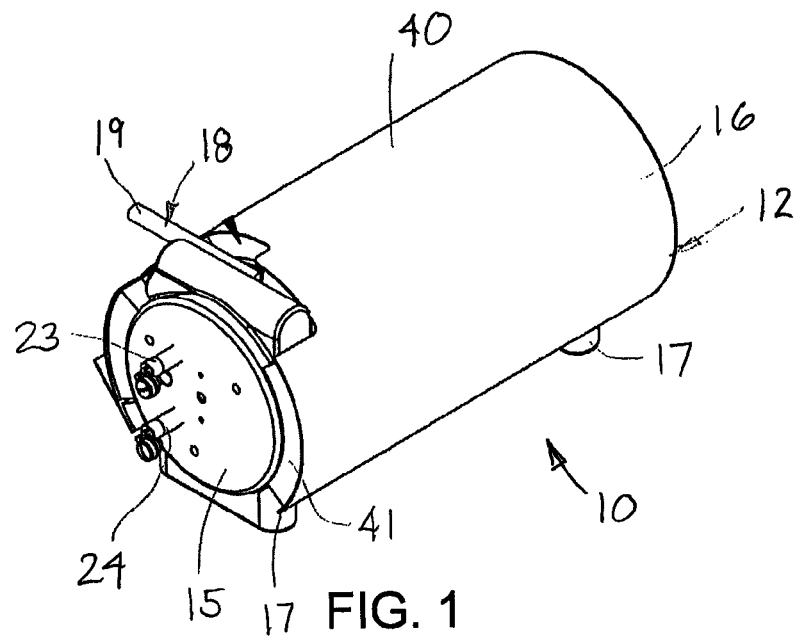
FIG. 1 is a perspective view of an inventive circulation heater.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
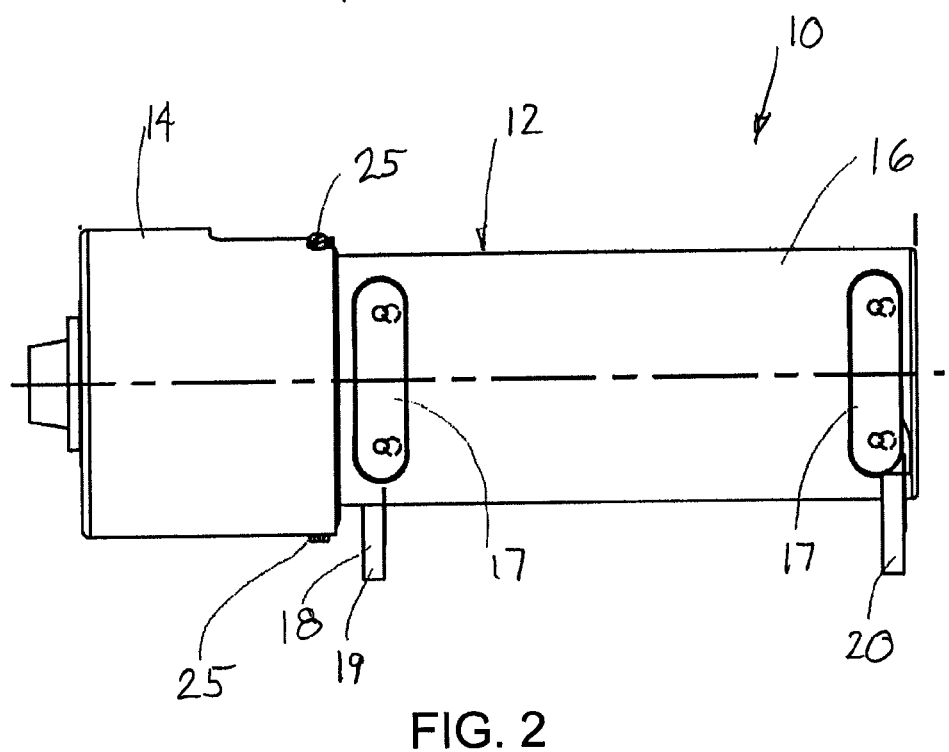
FIG. 2 is a bottom view thereof, showing an installed end cover.
Figure 3:
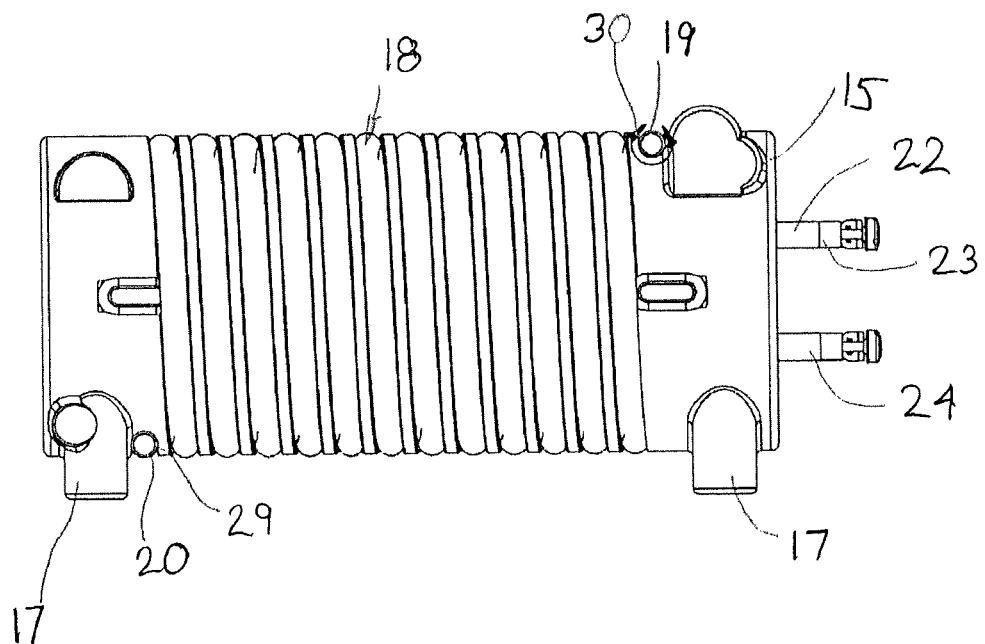
FIG. 3 is a side view of a heater assembly with an insulative jacket removed therefrom.

Referring to FIGS. 1 and 2, a circulation heater of the invention is shown which comprises a main heater assembly 12 which includes a removable end-cap 14 (FIG. 2). The heater assembly 12 comprises a monolithic heater body 15 having a removable insulation jacket or cover 16 wrapped thereabout. The heater assembly 12 further includes heater mounts 17 which are configured for mounting the heater 10 to an appropriate mounting location. As will be described in further detail herein, the heater assembly 12 includes a circulating heater tube 18, having a first tube end 19 and a second tube end 20 which are connectable to a fluid circulation system to allow a process fluid such as liquid or gas to flow therethrough. As described below, the heater tube 18 is surrounded by the jacket 16 after assembly.

Referring to FIGS. 1 and 3-5, the heater body 15 generally is configured from a cast metal, preferably aluminum, which is chosen for its desirable heat transfer characteristics and castability. During casting, the heater body 15 is formed generally as a monolithic cylinder while being integrally formed with the supports 17 thereon. During the casting stage, a heater element 22 is embedded within the mold during casting and completely surrounded and embedded within the casting material forming the heater body 15. The heater element 22 preferably is an electric resistance heating element which has first and second electrodes or terminals 23 and 24 which protrude from the heater body 15 and are connectable to an electrical supply during use of the circulation heater 10. During use, the electrodes or terminals 23 and 24 are subsequently covered by the end cap 14 (FIG. 2), which is secured in place by suitable fasteners 25 that screw into the heater body 15. It will be understood that other suitable manufacturing processes may be used to form the heater body 15

Figure 4:
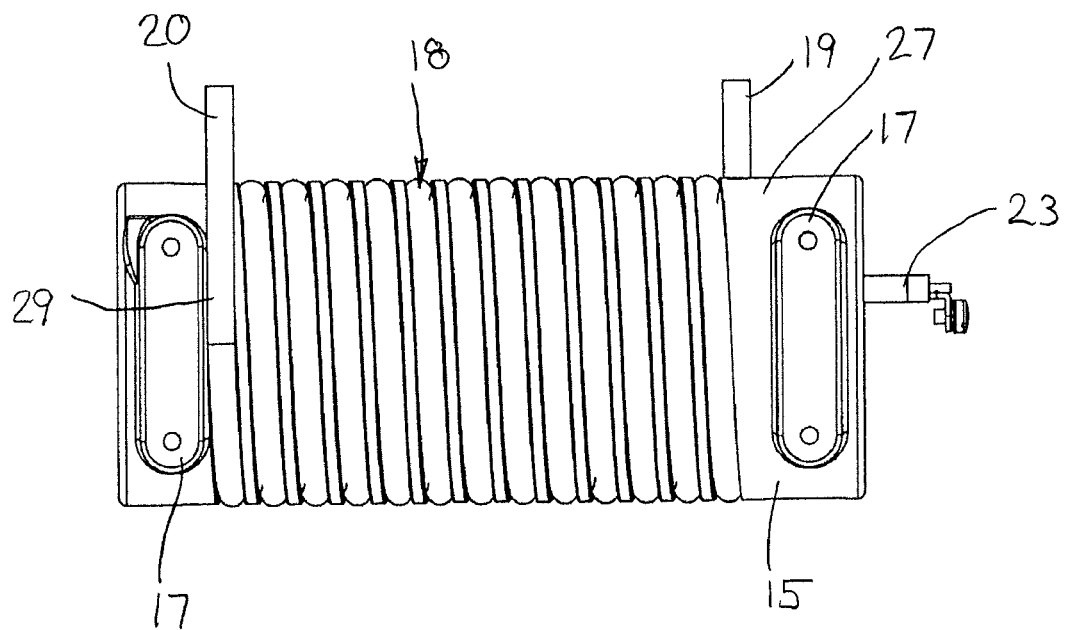
FIG. 4 is a bottom view thereof.
Figure 5:
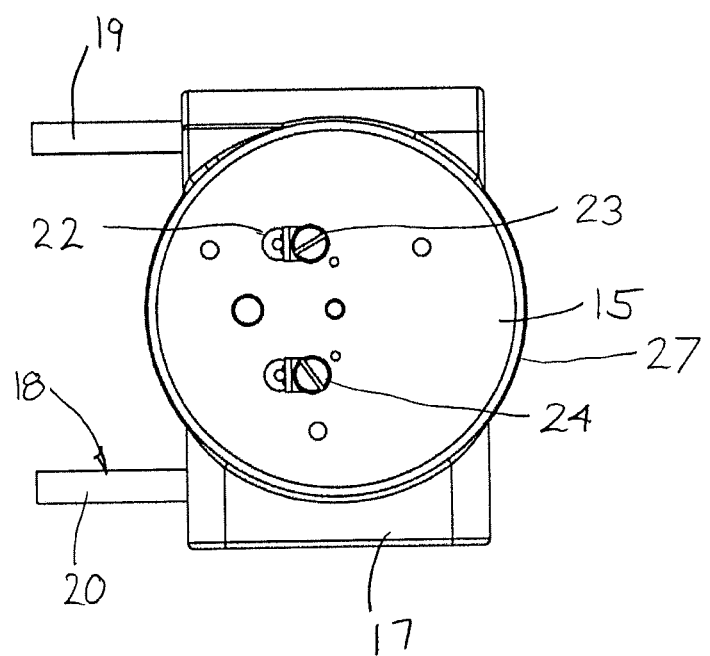
FIG. 5 is an end view thereof.
Figure 6:
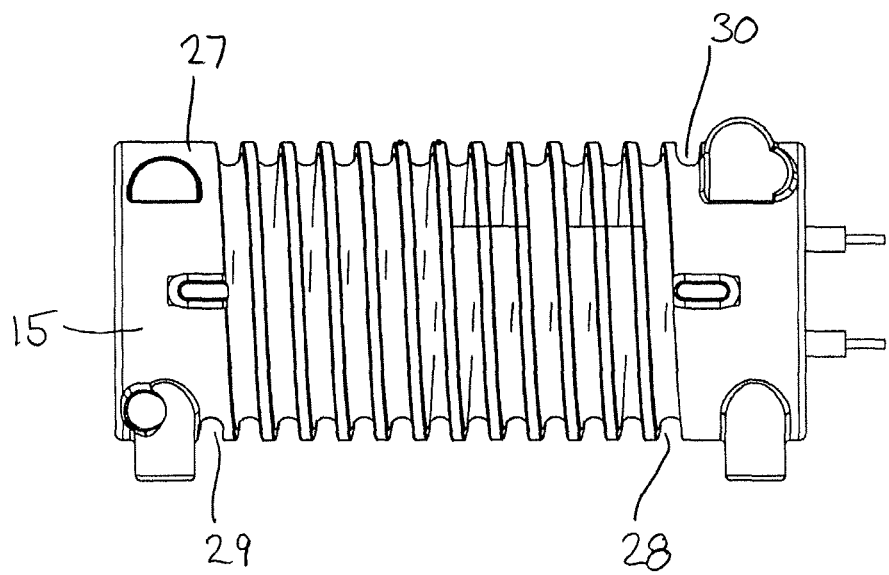
FIG. 6 is a side view of a cast heater body.
Figure 7:
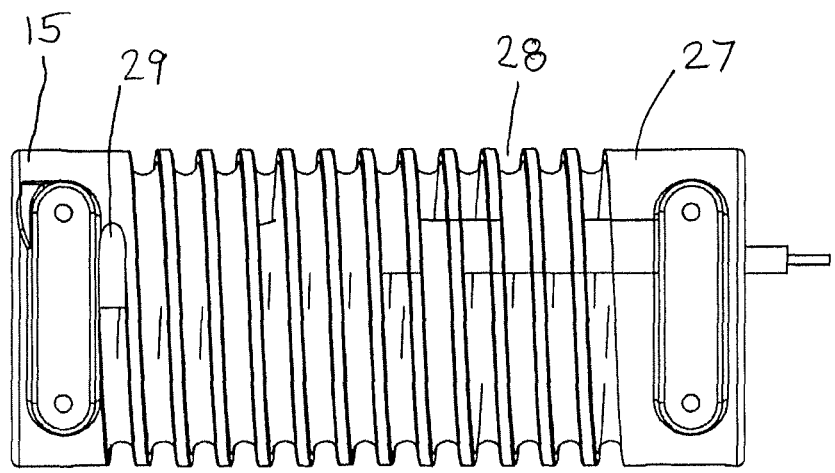
FIG. 7 is a bottom view thereof.

After casting is complete, the heater body 15 is formed with a cylindrical outer surface 27 which has a uniform diameter along the axial length of the heater body 15. This body material, such as aluminum, is machinable by a suitable tool. As such, after casting and solidification of the casting material, the outer body surface 27 is machined to form at least one spiral channel or channel 28 which starts at one end of the heater body 15 and terminates at the other end of the heater body 15. Preferably, the channel 28 is formed as a single spirally wound, circumferential channel which has one end 29 shown in FIGS. 6 and 7 and the second opposite end 30 shown in FIGS. 3 and 6. These groove ends, 29 and 30 open sidewardly to allow the tube ends 19 and 20 to project tangentially to the side as shown in FIG. 4. One tube end (19 or 20) serves as a fluid inlet and the other end (19 or 20) serves as the fluid outlet during circulation of fluid there through. The tube ends 19 and 20 are connected to a fluid circulation system during use of the heater 10.

Figure 8:
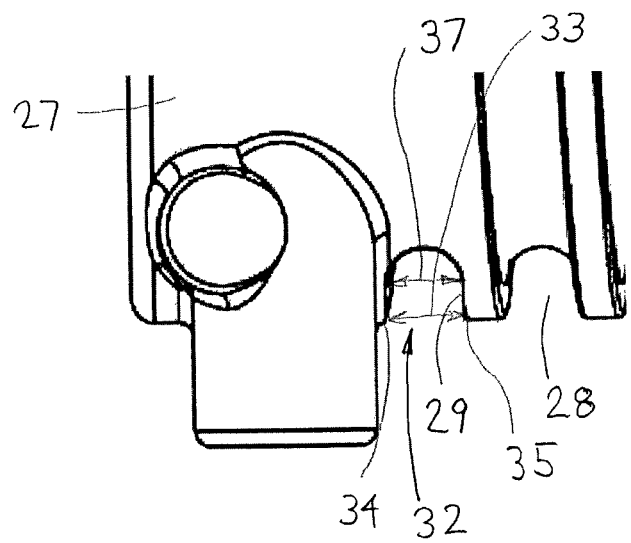
FIG. 8 is a partial, enlarged view of the heater body, showing one end of a tubing channel therein.
Figure 9:
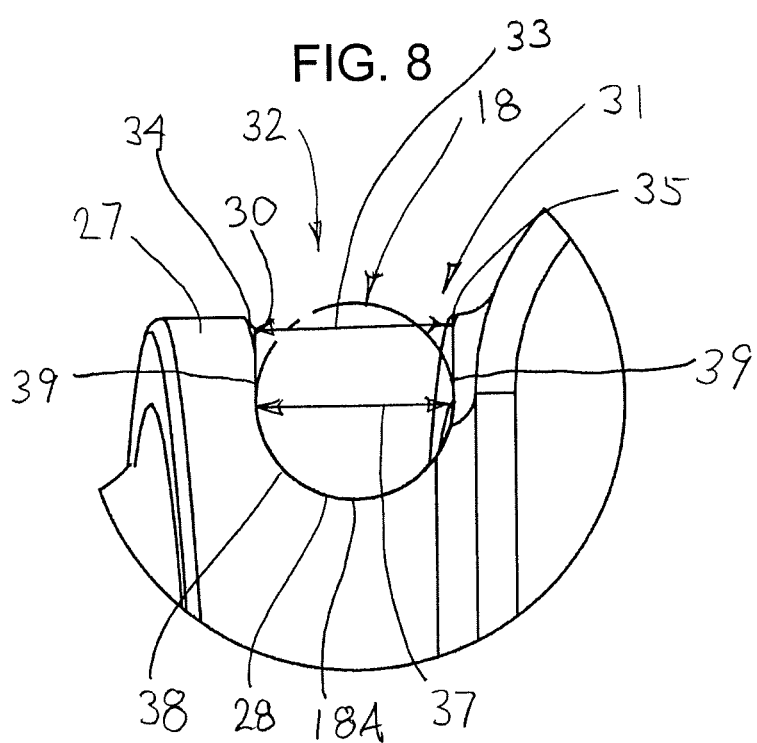
FIG. 9 is a side view of the tubing channel showing the profile thereof.

Referring to FIG. 8, the channel 28 is shown in the outer circumference 27 wherein the one channel end 29 is shown. FIG. 9 shows the opposite channel end 30, which is machined into the body circumference 27. The heater tube 18 is shown inserted within the channel 28. The channel 28 has a continuous profile extending entirely from one channel end to the other which is generally represented in more detail in FIG. 9.

Preferably, the spiral channel 28 is formed as an undercut groove which accepts tight fitting engagement of the heater tube 18. The channel 28 is substantially enclosed about the sides, except for an open channel side 31 which lies in and opens radially through the plane lying on the body surface 27. This open side essentially defines a spiral channel mouth 32 which opens radially and has a width 33 defined by first and second cutting edges 34 and 35. This dimension 33 is smaller than the maximum channel width indicated by reference arrow 37 and FIG. 9.

The channel width 37 generally, or very closely conforms to the outside diameter of the Teflon heater tube 18 while the mouth 33 is dimensioned narrower than the channel width 37. Essentially therefore, the channel width 37 defines an undercut channel portion that is constricted by the mouth 33 which has the dimension smaller than the tube diameter. During installation of the tube 18, the tube 18 flexes and deforms to a certain extent to fit through the mouth width 33. Due to the resiliency of the Teflon tube, the tube 18 then reshapes or restores itself so as to be in close continuous contact with the interior channel surface 38. Essentially, this channel surface 38 is in contact with the outside diameter of the tube 18 between two contact points generally indicated by reference numerals 39 in FIG. 9. As can be seen, this insures continuous surface to surface contact between the channel surface 38 and the outside surface 18A of the tube 18 to a circumferential extent which is greater than 180 degrees of the tube cross section. In other words, the channel surface 38 is in contact with the tube surface 18A over more than half of the tube circumference. This increases the surface area 18A of the tube 18 which is in contact with the material of the heater body 15 which thereby improves heat transfer between the contacting surfaces of the channel 38 and tube 18. If desired, the channel width 37 can be made smaller to a certain degree than the diameter of the tube 18 wherein the tube 18 can retain some deformation since the tube 18 can project radially out of the channel mouth 33 due to squeezing of the tube 18 by the channel 28. This channel profile continues throughout the entire length of the channel 28 and also exists at the opposite channel end 29 as indicated generally in FIG. 8.

Figure 10:
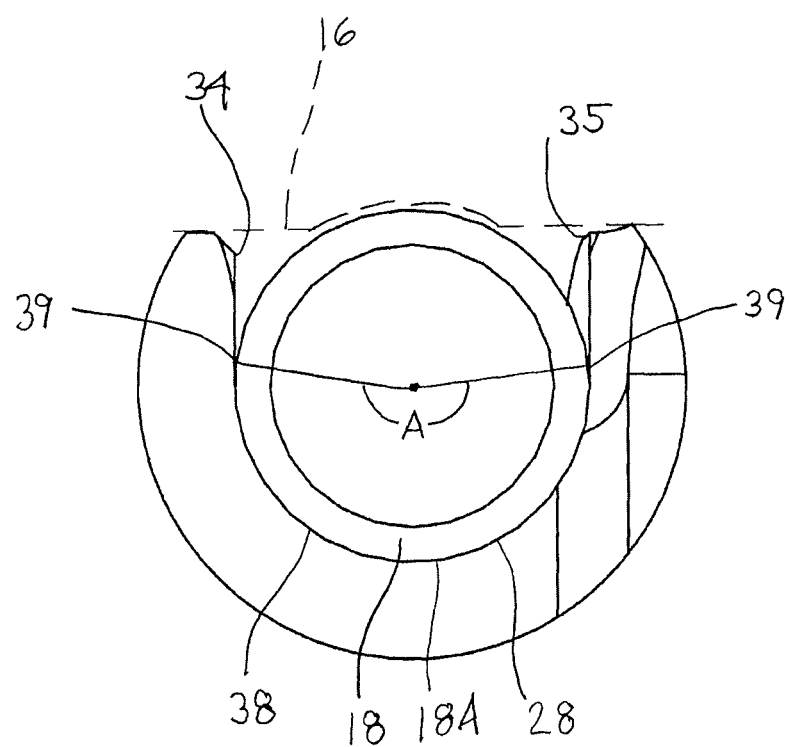
FIG. 10 is an enlarged view of the channel having the heater tube seated within the channel.

As seen in more detail in FIG. 10, the angle of surface contact is indicated by reference angle A which extends between the contact termination points 39. As can be seen, angle A is greater than 180 degrees which increases the contact surface due to the undercut profile of the channel 28. During installation, the tube 18 can be pressed manually or mechanically into the channel 28 by first inserting one of the ends 19 or 20 in its respective channel end 30 or 29, after which the tube 18 is wound and pressed into the channel 28. The tube 18 is wound spirally and continuously pressed into channel 28 along the entire length of the heater body 15 until the opposite tube end 19 or 20 is pressed into and projects tangentially from the other channel end 29 or 30. This sequential winding of the tube 18 allows the tube 18 to conform to the spiral shape of channel 28. The restricted channel mouth 33 serves to then restrain and hold the tube 18 within the channel 28 while the undercut profile of the channel 28 increases the contact area between the fluid carrying tube 18 and the heat transferring heater body 15.

As previously indicated, the tube 18 preferably is formed of a suitable material such as Teflon, which provides for contamination-free heating of liquids and gasses circulating through the tube 18. The material that is selected for the tube 18 preferably is chosen so as to prevent leaching of any tube particles and thereby preventing contamination of any process fluid being circulated. The Teflon material is also suitable because it has a high temperature capability to handle the heat generated by the resistance heater 10.

After installing the tube 18 within the channel 28, the insulative jacket 16 is then wrapped about the heater body 15 and secured in a cylindrical form, such as by snaps or other suitable fasteners. The jacket 16 is preferably formed of flexible insulation and has an outer surface layer 40 (FIG. 1) and an insulated layer 41 which promotes retention of the heat within the tube 18. Other layers may be provided such as heat reflective layers which further impede the loss of heat from the heater body 15 and tube 18. Alternatively, the jacket 16 also may have heating elements such as resistance wires or other heat generating structures which actively heat the tube 18 from the outside thereof.

Although a particular preferred embodiment of the invention has been disclosed in detail for illustrative purposes, it will be recognized that variations or modifications of the disclosed apparatus, including the rearrangement of parts, lie within the scope of the present invention.

We claim:

1. A circulation heater for heating fluids comprising:
a monolithic heater body formed of a heat conducting body material, and having an outer body surface extending axially between opposite first and second body ends, said heater body including at least one spiral heater channel formed in said outer body surface which starts at a first channel end disposed proximate said first body end and terminates at a second channel end disposed proximate said second body end, said heater channel being formed as an undercut groove which opens radially outwardly through an open channel mouth, said channel mouth being defined by axially spaced mouth edges which define a mouth width wherein said heater channel is undercut along each of said mouth edges so as to progressively widen from said mouth edges radially inwardly to a maximum channel width defined by an interior channel surface, said channel width being greater than said mouth width;
a heater element embedded within said heater body so as to be surrounded and embedded within said body material to generate and transfer heat to said heater body; and
a flexible circulating heater tube having a first tube end and a second tube end which are connectable to a fluid circulation system to allow a process fluid to flow through said heater tube, said heater tube being pressed into said body channel in tight-fitting engagement therewith wherein said heater tube spirals about said heater body, said heater tube being formed of a non-metal and being deformable for tight fitting insertion into said body channel wherein an outer tube diameter is larger than said mouth diameter and a substantial portion of an outer tube surface is in direct facing contact with said interior channel surface to effect heat transfer from said heater body to said heater tube and any fluid flowing therethrough, said heater tube being resiliently deformable so as to deform during pressing of said heater tube through said channel mouth and resiliently conform to said interior channel surface and said channel width in tight fitting engagement therewith, said heater tube having continuous surface to surface contact between said interior channel surface and said outer tube surface of said heater tube over a circumferential extent defined between first and second contact points located on said outer tube surface, wherein the angle between said contacts points and a center tube axis is greater than 180 degrees to facilitate heat transfer between said interior channel surface and said outer tube surface, each of said first and second contact points being spaced radially inwardly of said mouth edges and being disposed radially closer than said center tube axis to said mouth edges, wherein said interior channel surface and said outer tube surface are separated from each other radially outwardly of said first and second contact points.

2. The circulation heater according to claim 1, wherein said heater element is an electric resistance heating element which is connectable to an electrical supply to generate heat.

3. The circulation heater according to claim 2, wherein said heater body is configured from a cast metal and said heater channel is machined into said outer body surface.

4. The circulation heater according to claim 1, wherein said heater body is formed as a monolithic cylinder which has a uniform diameter defined by said outer body surface along an axial length of the heater body.

5. The circulation heater according to claim 4, wherein said heater channel is formed as a single spirally wound, circumferential channel and terminates at opposite first and second groove ends which open sidewardly to allow said first and second tube ends to project tangentially to the side from said first and second groove ends.

6. The circulation heater according to claim 1, wherein said heater tube includes a portion which protrudes radially outwardly from the channel mouth.

7. The circulation heater according to claim 1, wherein said mouth edges are spaced radially inwardly a small distance from said outer body surface and said channel widens from said mouth edges to said outer body surface.

8. A circulation heater for heating fluids comprising:
a monolithic heater body formed of a heat conducting body material, and having an outer body surface extending axially between opposite first and second body ends, said heater body including at least one spiral heater channel formed in said outer body surface which starts at a first channel end disposed proximate said first body end and terminates at a second channel end disposed proximate said second body end, said heater channel spiraling about said outer body surface;
a heater element embedded within said heater body so as to be surrounded and embedded within said body material to generate and transfer heat to said heater body; and
a flexible circulating heater tube having a first tube end and a second tube end which are connectable to a fluid circulation system to allow a process fluid to flow through said heater tube, said heater tube being pressed into said body channel in tight-fitting engagement therewith wherein said heater tube spirals about said heater body, said heater tube being formed of a non-metal and being resiliently deformable for tight fitting insertion into said body channel wherein a substantial portion of an outer tube surface is in direct facing contact with an interior channel surface to effect heater transfer from said heater body to said heater tube and any fluid flowing therethrough; and
said heater channel being formed as an undercut groove which accepts tight fitting engagement of said heater tube through an open channel mouth, said heater channel being substantially enclosed about interior sides and including an open side defined by said channel mouth which opens radially toward said outer body surface, said heater tube being resiliently deformable to fit through said open side, said channel mouth being defined by axially spaced mouth edges which define a mouth width wherein said heater channel is undercut along each of said mouth edges so as to progressively widen from said mouth edges radially inwardly to a maximum channel width defined by said interior channel surface, said channel width being greater than said mouth width, said heater tube having continuous surface to surface contact between said interior channel surface and said outer tube surface of said heater tube to a circumferential extent defined between first and second contact points on said outer tube surface, wherein an angle defined between said contacts points and a center tube axis is greater than 180 degrees to facilitate heat transfer between said interior channel surface and said outer tube surface, each of said first and second contact points being spaced radially inwardly of said mouth edges and being disposed radially closer than said center tube axis to said mouth edges, wherein said interior channel surface and said outer tube surface are separated from each other radially outwardly of said first and second contact points.

9. The circulation heater according to claim 8, wherein said channel mouth extends along a length of said heater channel and opens radially from said outer body surface.

10. The circulation heater according to claim 8, wherein said heater tube is resiliently deformable so as to deform during pressing of said heater tube through said open side and resiliently conform to said interior channel surface in tight fitting engagement therewith.

11. The circulation heater according to claim 10, wherein the resiliency of said heater tube expands after insertion through said open side so as to be in close continuous contact with said interior channel surface.

12. The circulation heater according to claim 11, wherein said interior channel surface is in contact with said outer tube surface of said heater tube over more than half of a tube circumference.

13. The circulation heater according to claim 8, which further includes an insulation jacket wrapped about said heater body and an exposed portion of said heater tube.

14. A method for constructing a circulation heater comprising the steps of:
forming a monolithic heater body formed by casting of a heat conducting body material, said heater body having an outer body surface extending axially between opposite first and second body ends;

providing a heater element before casting of said heater body wherein said heater element is embedded within said heater body during said forming of said heater body, said heater element surrounded and embedded within said body material to generate and transfer heat to said heater body; and machining at least one spiral heater channel in said outer body surface by removing body material such that said heater channel spirals about said outer body surface, and said heater channel is formed as an undercut groove having a channel mouth being defined by axially spaced mouth edges which define a mouth width wherein said heater channel is undercut along each of said mouth edges so as to progressively widen from said mouth edges radially inwardly to a maximum channel width defined by an interior channel surface, said channel width being greater than said mouth width;

providing a flexible circulating heater tube having a first tube end and a second tube end which are connectable to a fluid circulation system to allow a process fluid to flow through said heater tube, said heater tube being formed of a non-metal and being resiliently deformable for tight fitting insertion into said heater channel;

pressing said heater tube into said body channel in tight-fitting engagement therewith wherein said heater tube spirals about said heater body, and wherein said heater tube resiliently deforms during insertion into said heater channel and conforms to said heater channel with a substantial portion of an outer tube surface being in direct facing contact with said interior channel surface to effect heater transfer from said heater body to said heater tube and any fluid flowing therethrough, said heater tube having continuous surface to surface contact between said interior channel surface and said outer tube surface of said heater tube to a circumferential extent defined between first and second contact points, wherein the angle between said contacts points and a center tube axis is greater than 180 degrees to facilitate heat transfer between said interior channel surface and said outer tube surface each of said first and second contact points being spaced radially inwardly of said mouth edges and being disposed radially closer than said center tube axis to said mouth edges, wherein said interior channel surface and said outer tube surface are separated from each other radially outwardly of said first and second contact points.

15. The method of forming the circulation heater according to claim 14, wherein said pressing step comprises the steps of winding said heater tube spirally and continuously pressing said heater tube into said heater channel along an entire length of said heater body until opposite tube ends are pressed into and project tangentially from opposite channel ends.

16. The method of constructing the circulation heater according to claim 14, wherein said heater tube is pressed manually or mechanically into said heater channel by first inserting one of said tube ends in its respective channel end, after which said heater tube is wound and pressed into said heater channel wherein sequential winding of said heater tube allows said heater tube to conform to the spiral shape of said heater channel.

17. The circulation heater according to claim 13, wherein said heater tube includes said exposed portion which protrudes radially outwardly from the channel mouth beyond said outer body surface.

18. The circulation heater according to claim 17, wherein said mouth edges are spaced radially inwardly a small distance from said outer body surface and said channel widens from said mouth edges to said outer body surface.

* * * * *